Sept. 5, 1944.  M. P. PFEIL  2,357,542
OPTICAL PROJECTION POINTER
Filed March 25, 1943
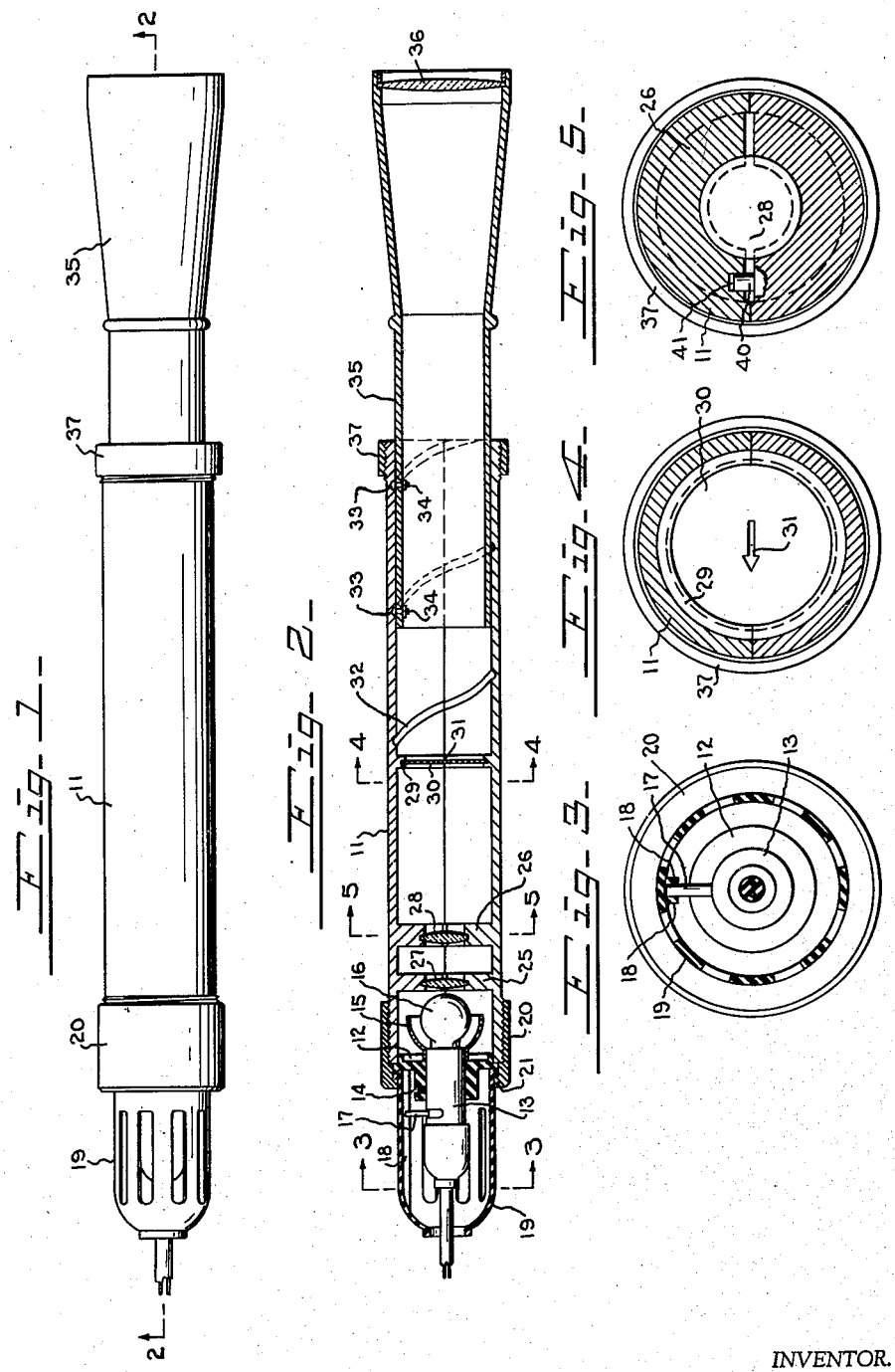
INVENTOR.
MELVIN P. PFEIL.
BY
*H.C. Kavel*
ATTORNEY.

Patented Sept. 5, 1944

2,357,542

UNITED STATES PATENT OFFICE 2,357,542

OPTICAL PROJECTION POINTER

Melvin P. Pfeil, Cincinnati, Ohio

Application March 25, 1943, Serial No. 480,591

1 Claim. (Cl. 88—24)

This invention relates to a new and improved optical projection pointer for use by lecturers and the like to indicate from a distance particular objects being projected on a screen.

The object of my invention is to provide a simple, lightweight optical projection pointer wherein a beam of light of definite formation can be projected a great distance to point out pictorial matter being described.

A further object is to so arrange the lenses to maintain the arrow formation of the projected light rays for a considerable distance.

Further objects reside in the novel construction of parts.

My invention will be further readily understood from the following description and claim, and from the drawing, in which latter:

Fig. 1 is a side view of my improved pointer.

Fig. 2 is a longitudinal section of the same, taken in the plane of the line 3—3 of Fig. 2.

Fig. 3 is a transverse section of the same, taken in the plane of the line 3—3 of Fig. 2.

Fig. 4 is a transverse section of the same, taken in the plane of the line 4—4 of Fig. 2, and;

Fig. 5 is a transverse section of the same, taken in the plane of the line 5—5 of Fig. 2.

My improved pointer comprises a tubular housing 11 which is split longitudinally to facilitate the assembling of the parts. A collar 12 is received in one end of the housing and supports a light socket 13, which is secured thereto by a screw 14. The light socket is provided with a reflector 15 about the light bulb 16. The light switch is an integral part of the socket 13 and has an operating arm 17 received between longitudinal ribs 18 in a rotatable cap 19. A threaded collar 20 is threaded to the housing 11, having a flange 21 for retaining the cap and collar 12 in position. The body 11 is preferably made of a molded plastic material and is provided with internal rings 25 and 26 arranged to support lenses 27 and 28. A further internal ring 29 retains an opaque disc 30 in which a configuration 31 is blanked therefrom to permit the light rays to extend therethrough. In the present exemplification, this configuration is in the form of an arrow.

The forward end of the housing 11 is provided with spiral groove 32 arranged to receive the heads 33 of bolts 34 secured in a tubular extension 35. The tubular extension 35 has a focusing lens 36 at its outer end, and by rotating the tube 35, the tube can be moved forward or backward in the housing 11 depending on the direction of rotation, to permit focusing of the projected light beam on the object being described. A threaded collar 37 is received over the forward end of the housing 11 to maintain the parts of the housing in assembled relation. One half of the ring 26 is provided with an extending pin 40 which is received in an aperture 41 in the other half of the ring 26 to position longitudinally, the two parts of the body member 11.

From the foregoing it will be apparent that I have devised a simple efficient optical projection pointer which can be readily assembled or repaired, which is easy to manipulate and is very useful, particularly to lecturers in pointing out particular objects of a group of objects or diagrams projected on a screen.

Having thus fully described my invention, what I claim as new and desire to secure by Letters Patent, is:

An optical projection pointer comprising a two-piece tubular housing, a pair of lenses rigidly positioned near one end of said housing, a shield in advance of said lenses, a tubular extension rotatably movable for endwise movement in said housing, a focusing lens in said extension, a pair of rings locking said housing together, a lamp and switch unit held in said housing by one of said rings, and a rotatable cap rotatable in said last-named ring having connection with said switch for operating said switch.

MELVIN P. PFEIL.